(12) United States Patent
Ho

(10) Patent No.: US 9,933,086 B2
(45) Date of Patent: Apr. 3, 2018

(54) GAS SUPPLY CONTROL DEVICE

(71) Applicants: Acw Tech Co., Ltd., Kaohsiung (TW); FU I SHIN ENTERPRISE CO., LTD., Kaohsiung (TW)

(72) Inventor: Mao-Chang Ho, Kaohsiung (TW)

(73) Assignees: ACW TECH CO., LTD., Kaohsiung (TW); FU I SHIN ENTERPRISE CO., LTD., Kaohsiung (TW)

( * ) Notice: Subject to any disclaimer, the term of this patent is extended or adjusted under 35 U.S.C. 154(b) by 0 days.

(21) Appl. No.: 15/233,965

(22) Filed: Aug. 11, 2016

(65) Prior Publication Data

US 2017/0350530 A1 Dec. 7, 2017

(30) Foreign Application Priority Data

Jun. 4, 2016 (TW) .............................. 105208456 U

(51) Int. Cl.
*F16K 1/32* (2006.01)
*F16K 31/44* (2006.01)

(52) U.S. Cl.
CPC ................ *F16K 31/44* (2013.01); *F16K 1/32* (2013.01)

(58) Field of Classification Search
USPC ....................................... 137/625.48
See application file for complete search history.

(56) References Cited

U.S. PATENT DOCUMENTS

| 3,495,623 A * | 2/1970 | Jespersen ................. F16K 1/44 |
| | | 137/625.36 |
| 7,108,241 B2 * | 9/2006 | Yoshino .............. F16K 31/1221 |
| | | 251/335.2 |
| 7,458,310 B2 * | 12/2008 | Junk ..................... F15B 11/044 |
| | | 91/274 |
| 8,118,278 B2 * | 2/2012 | Hays ........................ F16K 7/12 |
| | | 251/331 |

* cited by examiner

*Primary Examiner* — John Fox
(74) *Attorney, Agent, or Firm* — Leong C. Lei

(57) ABSTRACT

A gas supply control device includes a main body, a control valve assembly extending into and received in the main body, a bottom lid attached to a bottom surface of the main body, and a top cover attached to a top surface of the main body. The gas supply control device provides an effect of simplicity and accuracy of gas supply therethrough.

6 Claims, 4 Drawing Sheets

GAS SUPPLY CONTROL DEVICE

(A) TECHNICAL FIELD OF THE INVENTION

The present invention relates generally to a gas supply control device, and more particularly to a gas supply control device that helps improve simplicity and accuracy of gas supply.

(B) DESCRIPTION OF THE PRIOR ART

In the semiconductor industry, special gases are necessary for manufacturing chips. The consumption of such special gases is generally high and the cost is expensive. Thus, specific users of such special gases are often very careful in controlling such gases in order to control the cost.

Thus, it is an urgent issue for manufacturers of gas supply control devices to provide a gas supply control device, which allows special gas users to effectively control the utilization cost of special gases.

SUMMARY OF THE INVENTION

An object of the present invention is to provide a gas supply control device, which helps improve simplicity and accuracy in supplying of special gases.

Thus, a technical solution according to claim 1 of the present invention provides a gas supply control device. The gas supply control device comprises a main body, a control valve assembly extending into and received in the main body, a bottom lid attached to a bottom surface of the main body, and a top cover attached to a top surface of the main body.

The efficacy that the technical solution according to claim 1 of the present invention may achieve is that the gas supply control device provides an effect of simplicity and accuracy of gas supply therethrough.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
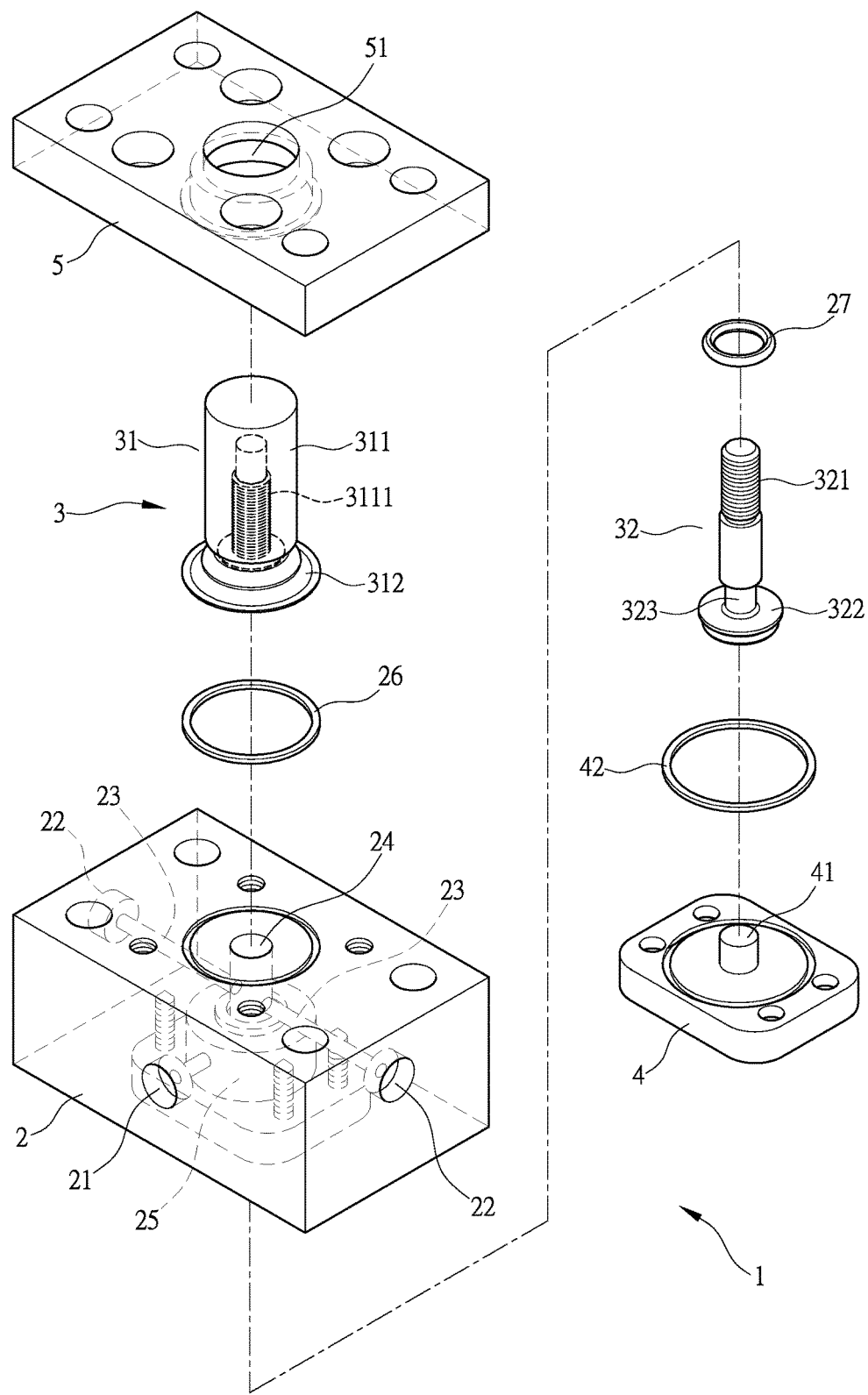
FIG. 1 is an exploded view showing a gas supply control device according to the present invention.
Figure 2:
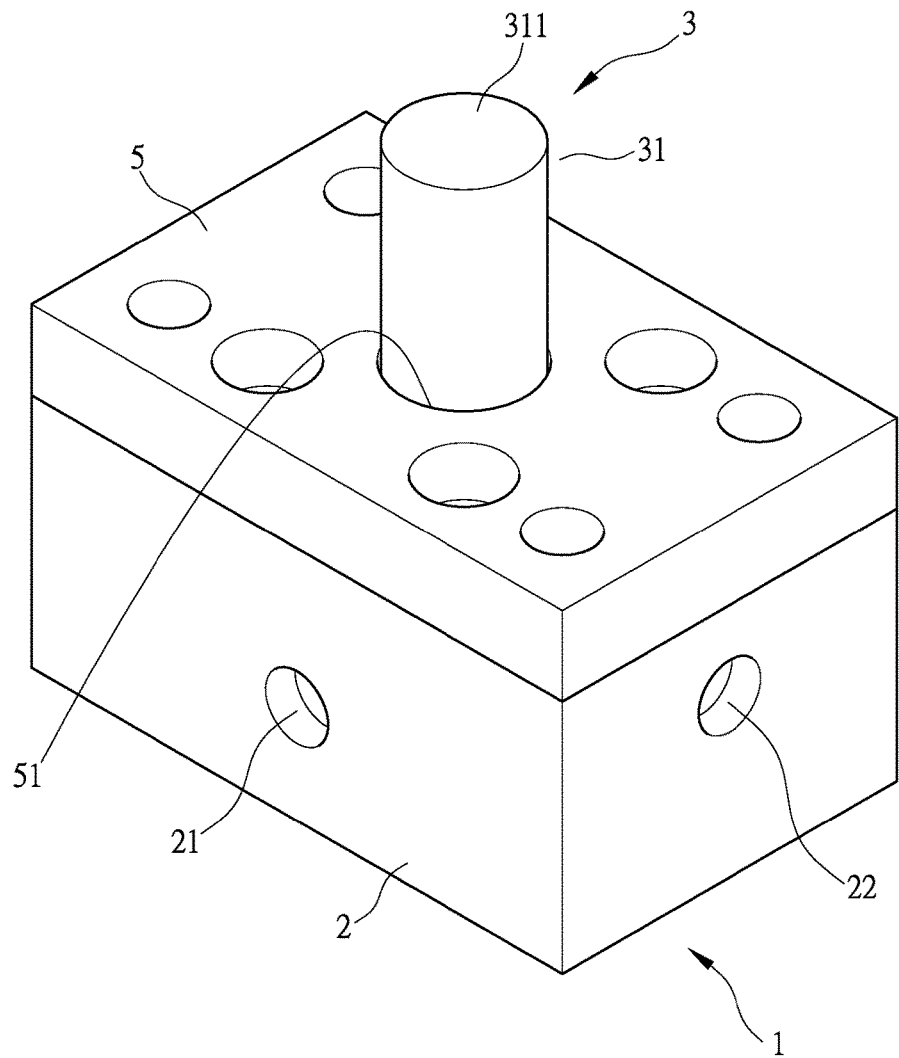
FIG. 2 is a perspective view illustrating the gas supply control device according to the present invention.

Firstly, referring to FIGS. 1 and 2, the present invention provides a gas supply control device 1, which comprises a main body 2, a control valve assembly 3 extending into and received in the main body 2, a bottom lid 4 attached to a bottom surface of the main body 2, and a top cover 5 attached to a top surface of the main body 2.

As shown in FIGS. 1 and 2, the main body 2 comprises a block having a rectangular cross-section having a long major axis and a short minor axis. The main body 2 is provided with a gas inlet opening 21 formed in one side surface thereof and extending along the minor axis and the main body 2 is also provided with a gas outlet opening 22 formed in each of two opposite side surfaces thereof in the direction of the major axis and extending along the major axis. The two gas outlet openings 22 are in communication with each other through a gas outlet channel 23 formed in the block. The main body 2 is provided, at a location around a central portion thereof, with a control valve assembly mounting hole 24 that extends through the block from the top surface to the bottom surface and also extends through and is set in communication with the gas outlet channel 23. The bottom surface of the main body 2 is provided with a receiving section 25, in the form of a hollow, extending upward from the bottom surface into the block and corresponding to the control valve assembly mounting hole 24 such that the receiving section 25 has a lower end that is open and an upper end connected to and in communication with the control valve assembly mounting hole 24. Further, the receiving section 25 is set in communication with the gas inlet opening 21 through one side wall thereof. The main body 2 is provided, on the top surface thereof, with a seal gasket 26. The receiving section 25 is provided, at the upper end thereof, with a seal ring 27 arranged around a circumference thereof at the connection with the control valve assembly mounting hole 24.

As shown in FIGS. 1 and 2, the control valve assembly 3 comprises an elasticity-based movable bar 31 and a plug bar 32 screwed into the elasticity-based movable bar 31. The elasticity-based movable bar 31 comprises a bar screwing section 311 and an elastic membrane 312 mounted to a lower end of the bar screwing section 311 such that the elastic membrane 312 allows the control valve assembly 3 to do a linear movement in an up-down direction upon being acted on by an external force. The bar screwing section 311 comprises a screwing hole 3111 formed therein. The plug bar 32 comprises a screw section 321 and a plug 322 mounted to a lower end of the screw section 321 and is recessed, in a circumferential portion thereof or a part thereof, such that a passage neck section 323 is formed between the screw section 321 and the plug 322. The screw section 321 is screwable into the screwing hole 3111 of the bar screwing section 311 of the elasticity-based movable bar 31 so that the plug bar 32 is attached, through threading engagement, to the elasticity-based movable bar 31 and is thus drivable by the elasticity-based movable bar 31 to do a linear movement in the up-down direction.

As shown in FIGS. 1 and 2, the bottom lid 4 is attached to and locked on the bottom surface of the main body 2. More precisely, the bottom lid 4 is set on and covers the lower end of the receiving section 25 of the main body 2 such that the bottom lid 4 closes the lower end of the receiving section 25. The bottom lid 4 is provided with a projection block 41 facing toward and projecting into the receiving section 25. A seal gasket 42 is provided around a circumference of the projection block 41. The projection block 41 is arranged to receive the plug 322 of the control valve assembly 3 to selectively sit thereon and the projection block 41 also functions a limit that defines the lowest point for a downward stroke of the linear movement of the control valve assembly 3.

As shown in FIGS. 1 and 2, the top cover 5 is attached to and locked on the top surface of the main body 2. More precisely, the top cover 5 is set on and covers an upper end of the control valve assembly mounting hole 24 of the main body 2. The top cover 5 is provided with a through hole 51, such that the through hole 51 allows the bar screwing section 311 of the elasticity-based movable bar 31 of the control valve assembly 3 to extend therethrough.

Figure 3:
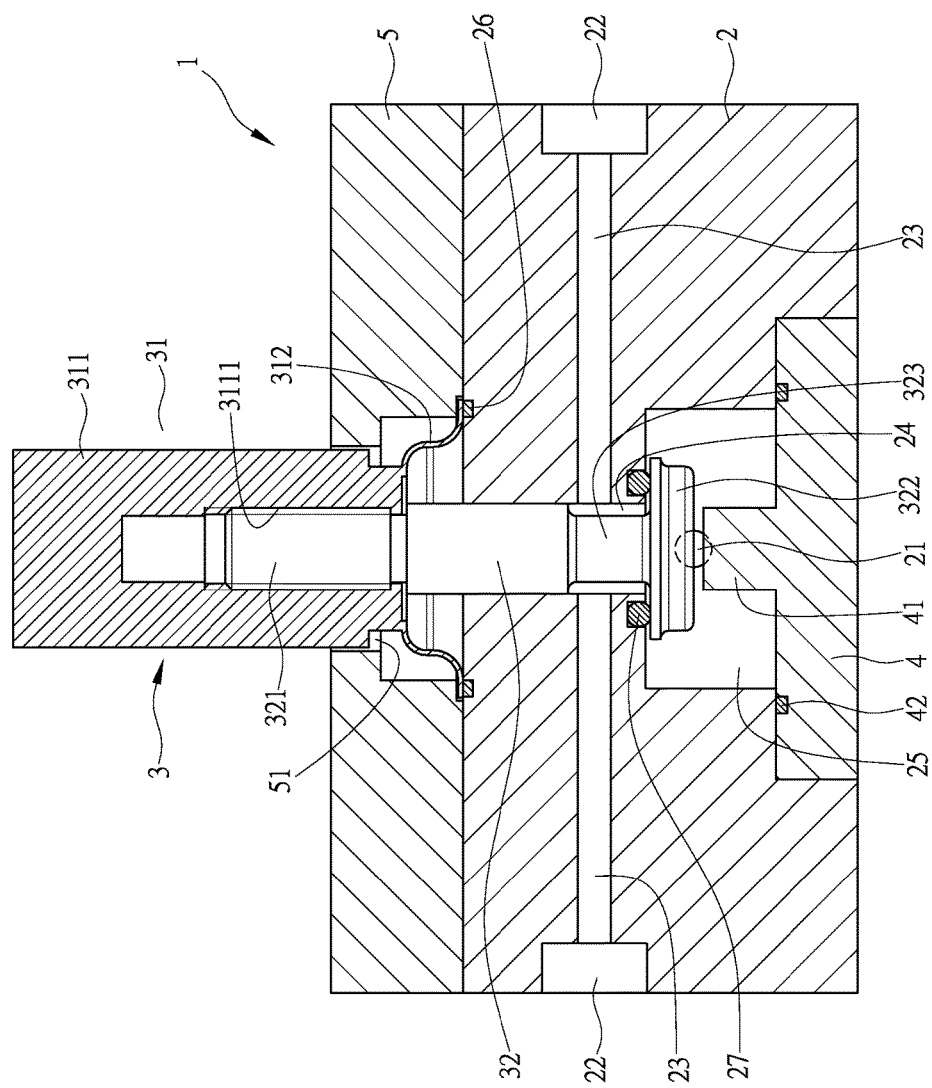
FIG. 3 is a schematic view illustrating the gas supply control device of the present invention in a condition of shutting down gas supply.

As shown in FIGS. 1, 2, and 3, to practice the present invention, the plug bar 32 of the control valve assembly 3 is put through the control valve assembly mounting hole 24 of the main body 2 such that the screw section 321 of the plug bar 32 projects outside the control valve assembly mounting hole 24 of the main body 2. The bottom lid 4 is mounted to the lower end of the receiving section 25 of the main body 2 such that the projection block 41 of the bottom lid 4 is located exactly under the plug 322 of the plug bar 32 of the control valve assembly 3. The top cover 5 is mounted to and set above the control valve assembly mounting hole 24 of the main body 2 such that the elasticity-based movable bar 31 of the control valve assembly 3 is received through the through hole 51 of the top cover 5 and is partly exposed outside the top cover 5. This would complete the assembly of the gas supply control device 1 according to the present invention.

As shown in FIG. 3, during the assembly of the gas supply control device 1, the elasticity-based movable bar 31 of the control valve assembly 3 is screwed onto and set in tight screwing engagement with the screw section 321 of the plug bar 32 in order to cause an upward linear movement of the plug bar 32 such that the plug 322 on the lower end of the screw section 321 is positioned against the seal ring 27 in the receiving section 25, whereby when external gas travels through the gas inlet opening 21 of the main body 2 to get into the receiving section 25, due to an upper surface of the plug 322 being positioned against the seal ring 27 inside the receiving section 25, a passage between the receiving section 25 and the control valve assembly mounting hole 24 and the gas outlet channel 23 is closed whereby the external gas is trapped and retained in the receiving section 25 and is not allowed to flow out of the main body 2. In other words, the gas supply control device 1 is in a condition of cutting of gas supply.

Figure 4:
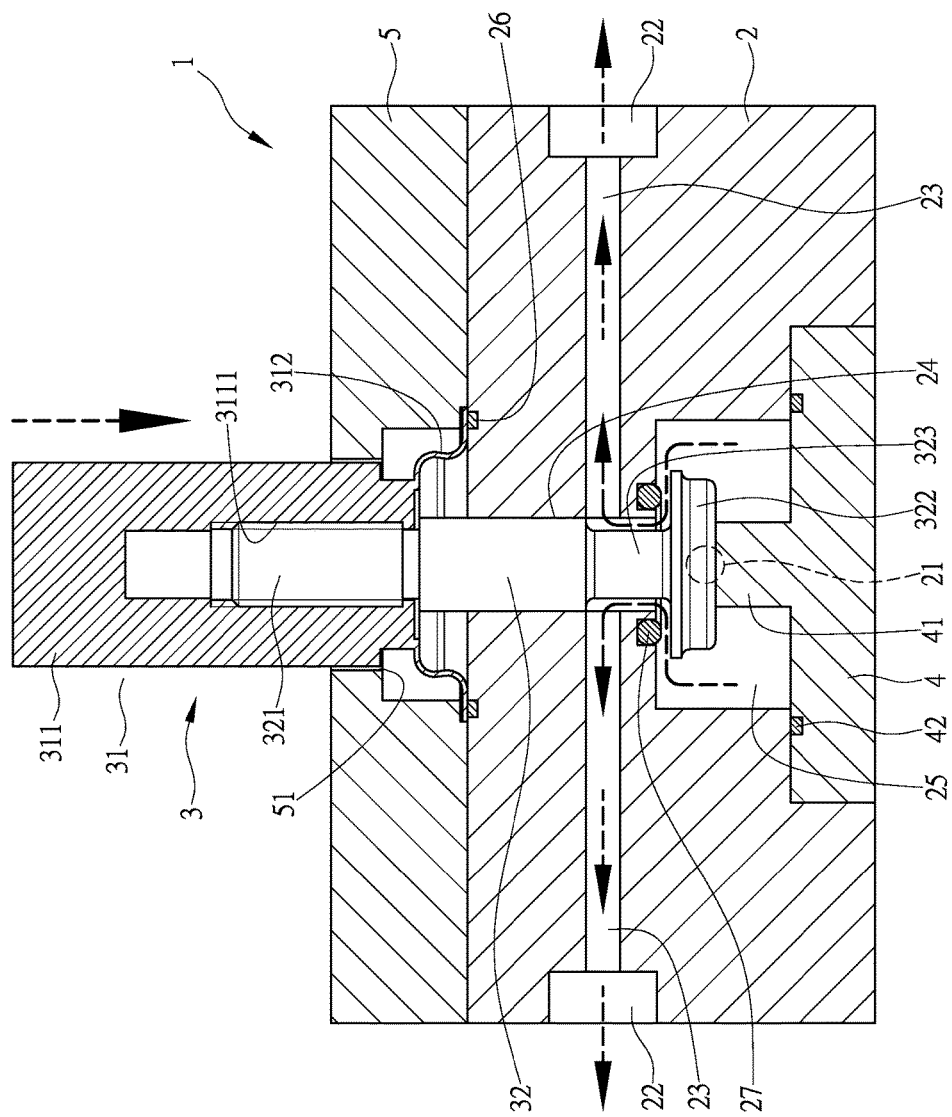
FIG. 4 is a schematic view illustrating the gas supply control device of the present invention in a condition of allowing gas to flow therethrough and thus be supplied.

As shown in FIG. 4, when a user needs to have gas supplied from the gas supply control device 1, the user only needs to apply a pressing force of a predetermined magnitude to a part of the elasticity-based movable bar 31 of the control valve assembly 3 that projects beyond and is exposed outside the top cover 5. When the elasticity-based movable bar 31 of the control valve assembly 3 receives and is acted upon by the force, the control valve assembly 3 is caused to do downward linear movement along the control valve assembly mounting hole 24 of the main body 2 so that the plug 322 of the control valve assembly 3 is separated from and is no longer positioned against the seal ring 27 inside the receiving section 25. Under this condition, the gas that is filled in the receiving section 25 is allowed to flow and pass through the passage neck section 323 of the control valve assembly 3 to get into the control valve assembly mounting hole 24 and then flows out through the gas outlet openings 22 of the gas outlet channel 23. In this way, gas is supplied from the gas supply control device 1 of the present invention.

The efficacy of the present invention is that a gas supply control device 1 is provided, which comprises a main body 2, a control valve assembly 3 extending into and received in the main body, a bottom lid 4 mounted to a bottom surface of the main body 2, and a top cover 5 mounted to a top surface of the main body 2, to provide an effect of simplicity and accuracy of gas supply through the gas supply control device 1.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A gas supply control device, comprising a main body, a control valve assembly extending into and received in the main body, a bottom lid attached to a bottom surface of the main body, and a top cover attached to a top surface of the main body, wherein the main body comprises a gas inlet opening and two gas outlet openings, the two gas outlet openings being in communication with each other through a gas outlet channel, the main body comprising a control valve assembly mounting hole formed therein at a location around a central portion thereof and extending therethrough from the top surface to the bottom surface and also extending through and in communication with the gas outlet channel, the bottom surface of the main body being provided with a receiving section corresponding to the control valve assembly mounting hole and extending upward from the bottom surface, the receiving section having a lower end that forms an opening, the receiving section having an upper end that is connected to and in communication with the control valve assembly mounting hole, the receiving section being set in communication with the gas inlet opening through a side wall thereof, the main body being provided on the top surface thereof with a seal gasket, the receiving section being provided with a seal ring arranged around a circumference thereof at the connection with the control valve assembly mounting hole.

2. The gas supply control device according to claim 1, wherein the main body comprises a block having a rectangular cross-section having a major axis and a minor axis and the gas inlet opening is formed in one side of the main body in a direction along the minor axis and the gas outlet openings are respectively formed in two opposite sides of the main body in a direction along the major axis.

3. The gas supply control device according to claim 1, wherein the control valve assembly comprises an elasticity-based movable bar and a plug bar screwed to the elasticity-based movable bar.

4. The gas supply control device according to claim 3, wherein the elasticity-based movable bar comprises a bar screwing section and an elastic membrane attached to a lower end of the bar screwing section, the elastic membrane being arranged to allow the control valve assembly, upon receiving an external force acting thereon, to conduct a linear movement in an up-down direction, the bar screwing section comprising a screwing hole formed therein; and the plug bar comprises a screw section and a plug mounted to a lower end of the screw section such that a passage neck portion is formed between the screw section and the plug by recessing a portion thereof, the screw section being screwable into the screwing hole of the bar screwing section of the elasticity-based movable bar so that the plug bar is mounted to the elasticity-based movable bar and is drivable by the elasticity-based movable bar to conduct a linear movement in the up-down direction.

5. The gas supply control device according to claim 1, wherein the main body comprises a receiving section and the bottom lid is set on and covers a lower end of the receiving section of the main body so that the bottom lid closes the lower end of the receiving section, the bottom lid comprising a projection block facing toward the receiving section, a seal gasket being provided along a circumference of the projection block; and the control valve assembly comprises a plug, the projection block being arranged to receive the plug of the control valve assembly to selectively sit thereon, the projection block also serving as a limit that defines a lowest position of a downward stroke of a linear movement of the control valve assembly.

6. The gas supply control device according to claim 1, wherein the main body comprises a control valve assembly mounting hole, the top cover being set on and covering an upper end of the control valve assembly mounting hole of the main body, the top cover comprising a through hole formed therein, the control valve assembly comprising an elasticity-based movable bar, the through hole receiving the elasticity-based movable bar of the control valve assembly to extend therethrough.

\* \* \* \* \*